(12) United States Patent
Wiesenburger (10) Patent No.: US 9,642,300 B2
(45) Date of Patent: *May 9, 2017

(54) FERTILIZER TUBE SYSTEM

(71) Applicant: Brent W. Wiesenburger, Aberdeen, SD (US)

(72) Inventor: Brent W. Wiesenburger, Aberdeen, SD (US)

(73) Assignee: Totally Tubular Mfg., Inc., Aberdeen, SD (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/682,486

(22) Filed: Apr. 9, 2015

(65) Prior Publication Data

US 2016/0295794 A1    Oct. 13, 2016

(51) Int. Cl.
*A01C 7/06*    (2006.01)
*A01C 23/02*    (2006.01)

(52) U.S. Cl.
CPC .............. *A01C 23/025* (2013.01); *A01C 7/06* (2013.01)

(58) Field of Classification Search
CPC ........... A01C 7/06; A01C 7/00; A01C 23/025; A01C 23/023; A01C 23/02; A01C 23/00
See application file for complete search history.

(56) References Cited

U.S. PATENT DOCUMENTS

| | | |
|---|---|---|
| 791,465 A | 6/1905 | Henderson |
| 1,302,428 A | 4/1919 | Pereda |
| 2,874,878 A | 2/1959 | Stokland |
| 2,912,944 A | 11/1959 | Snow |
| 3,207,389 A | 9/1965 | Beebe |
| 3,319,589 A | 5/1967 | Moran |
| 3,632,043 A | 1/1972 | Kirschmann |
| 3,653,550 A | 4/1972 | Williams |
| 4,224,882 A | 9/1980 | Cruse |
| 4,628,840 A | 12/1986 | Jacobson |
| 4,656,957 A | 4/1987 | Williamson |
| 4,947,770 A | 8/1990 | Johnston |
| 4,998,488 A | 3/1991 | Hansson |
| 5,027,724 A | 7/1991 | Ptacek |
| 5,269,237 A | 12/1993 | Baker |
| 5,370,068 A | 12/1994 | Rawson |
| 5,461,994 A | 10/1995 | Zimmerman |
| 5,477,792 A | 12/1995 | Bassett |
| 5,622,124 A | 4/1997 | Smith |
| 5,862,763 A | 1/1999 | Dietrich, Sr. |

(Continued)

OTHER PUBLICATIONS

Page 1 & p. 16 of Kinze Model 4900 Front Folding Planter Parts Manual; Manual at www.kinze.com/filesimages/manuals/4900_M0247-02_R0115.pdf; Printed Mar. 19, 2015.

*Primary Examiner* — Christopher J Novosad
(74) *Attorney, Agent, or Firm* — Neustel Law Offices (57) ABSTRACT

A fertilizer tube system for efficiently dispensing and placing fertilizer within a furrow to minimize germination injury. The fertilizer tube system generally includes a fertilizer tube having an input opening at a lower end of the fertilizer tube and an output opening at an upper end of the fertilizer tube, a tab attached to the fertilizer tube between the input opening and the output opening, a guard scraper attached to a lower portion of the fertilizer tube, wherein the guard scraper is removably attachable within a slot of a planter shank.

20 Claims, 13 Drawing Sheets

(56) References Cited

U.S. PATENT DOCUMENTS

| | | |
|---|---|---|
| 6,006,684 A | 12/1999 | Whalen |
| 6,095,065 A | 8/2000 | Dietrich, Sr. |
| 6,289,829 B1 | 9/2001 | Fish |
| 6,363,870 B1 | 4/2002 | King |
| 7,096,805 B1 | 8/2006 | Wiesenburger |
| 7,128,007 B1 | 10/2006 | Wiesenburger |
| 2009/0308296 A1* | 12/2009 | Senchuk ................ A01C 5/062 111/8 |

* cited by examiner

FERTILIZER TUBE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a fertilizer applicator and more specifically it relates to a fertilizer tube system for efficiently dispensing and placing fertilizer within a furrow to minimize germination injury.

Description of the Related Art

Any discussion of the related art throughout the specification should in no way be considered as an admission that such related art is widely known or forms part of common general knowledge in the field.

Liquid fertilizer applicators have been in use for years. Typically, the placement of liquid fertilizer in close proximity to seeds during the planting process is done to improve crop yields. Unfortunately, current liquid fertilizer applicators utilized in the farming industry sometimes directly apply liquid fertilizer to the seed which results in burning of the seed thereby increasing germination injury.

While these devices may be suitable for the particular purpose to which they address, they are not as suitable for efficiently dispensing and placing liquid fertilizer within a furrow to minimize germination injury. Conventional fertilizer applicators tend to directly apply the fertilizer upon the seed thereby increasing germination injury.

BRIEF SUMMARY OF THE INVENTION

The invention generally relates to a fertilizer applicator which includes a fertilizer tube having an input opening at a lower end of the fertilizer tube and an output opening at an upper end of the fertilizer tube, a tab attached to the fertilizer tube between the input opening and the output opening, a guard scraper attached to a lower portion of the fertilizer tube, wherein the guard scraper is removably attachable within a slot of a planter shank.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 15 illustrate a fertilizer tube system 10, which comprises a fertilizer tube 30 having an input opening 31 at a lower end of the fertilizer tube 30 and an output opening 39 at an upper end of the fertilizer tube 30, a tab 50 attached to the fertilizer tube 30 between the input opening 31 and the output opening 39, a guard scraper 20 attached to a lower portion of the fertilizer tube 30, wherein the guard scraper 20 is removably attachable within a slot of a planter shank 14. The present invention is designed to be utilized in combination with a liquid fertilizer system used on a crop planter implement but may be utilized to dispense additional types of fertilizer such as non-liquid fertilizer. U.S. Pat. No. 7,096,805 (Liquid Fertilizer Application System) and U.S. Pat. No. 7,128,007 (Liquid Fertilizer Application System) both to Wiesenburger are hereby incorporated by reference herein in their entireties.

The present invention may be utilized with any type of planter implement designed for planting a row crop such as, but not limited to, the KINZE 4000 Series Cast Iron Row Unit (e.g. the KINZE 4900 planter implement) manufactured by KINZE Manufacturing Inc. in Williamsburg, Iowa. The present invention may be utilized with respect to various other types of planter implements.

B. Fertilizer Tube

Figure 1:
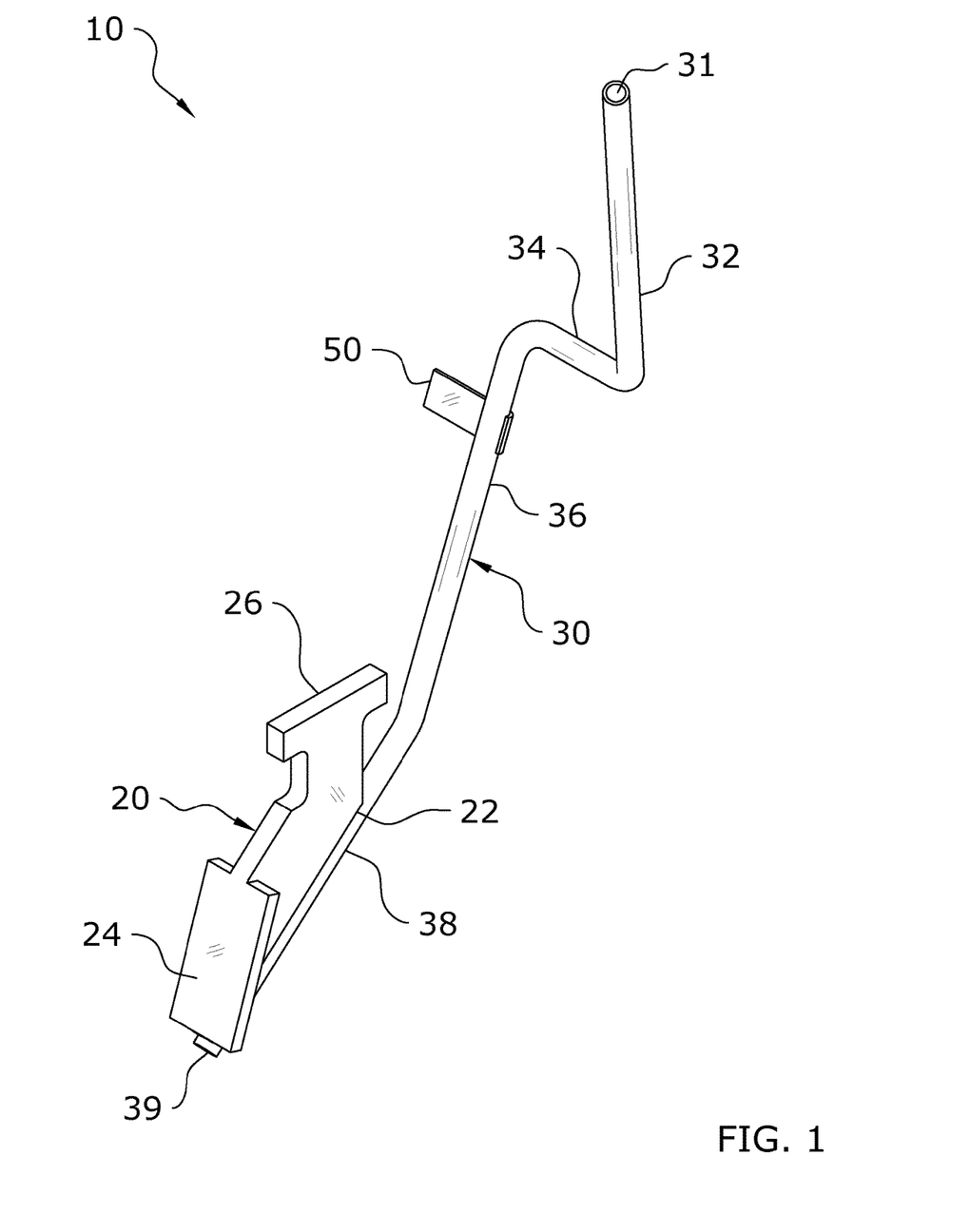
FIG. 1 is an upper right side perspective view of the present invention.
Figure 2:
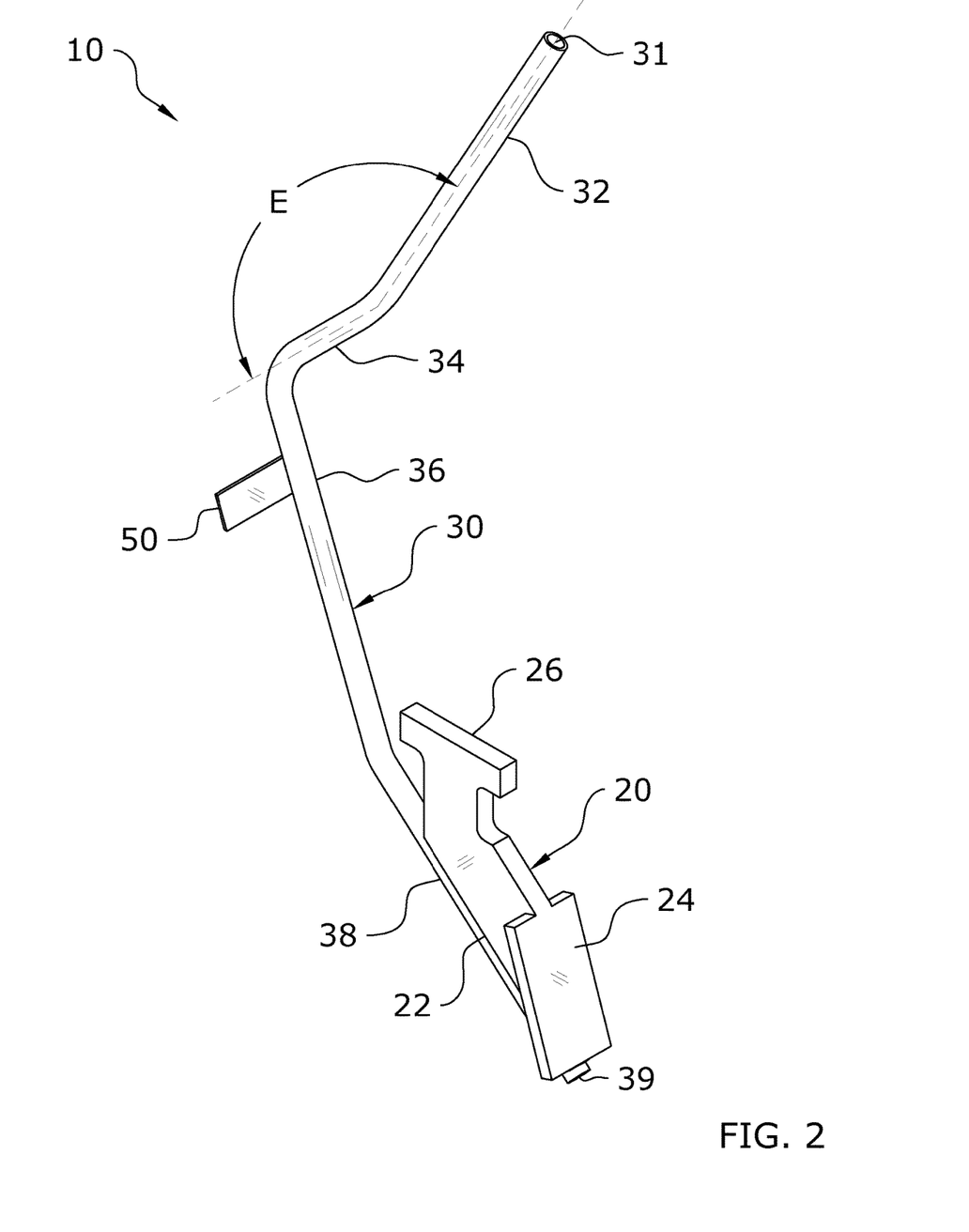
FIG. 2 is an upper left side perspective view of the present invention.
Figure 14:
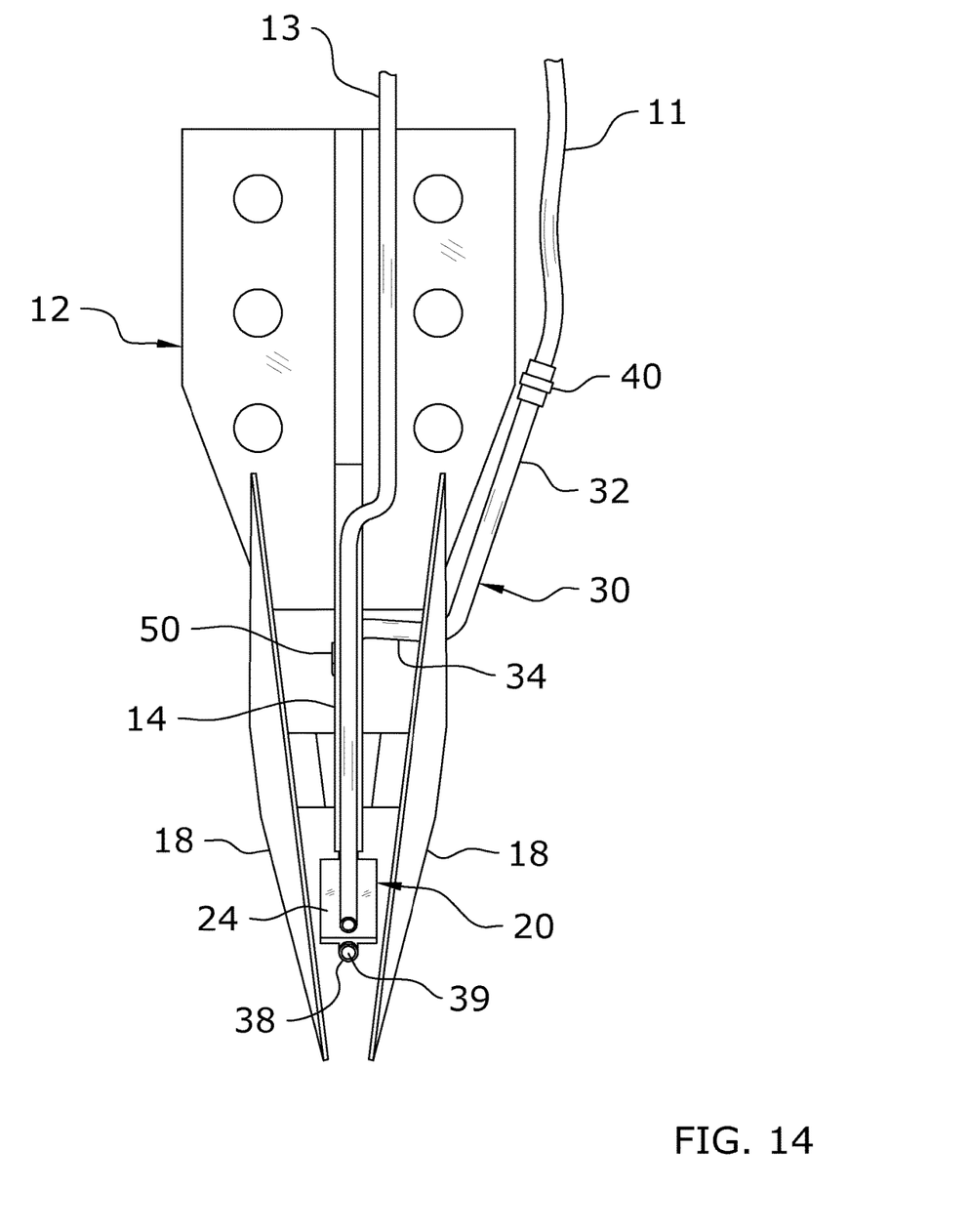
FIG. 14 is a rear view of the present invention attached to the planter shank with a seed tube positioned above the guard scraper.
Figure 15:
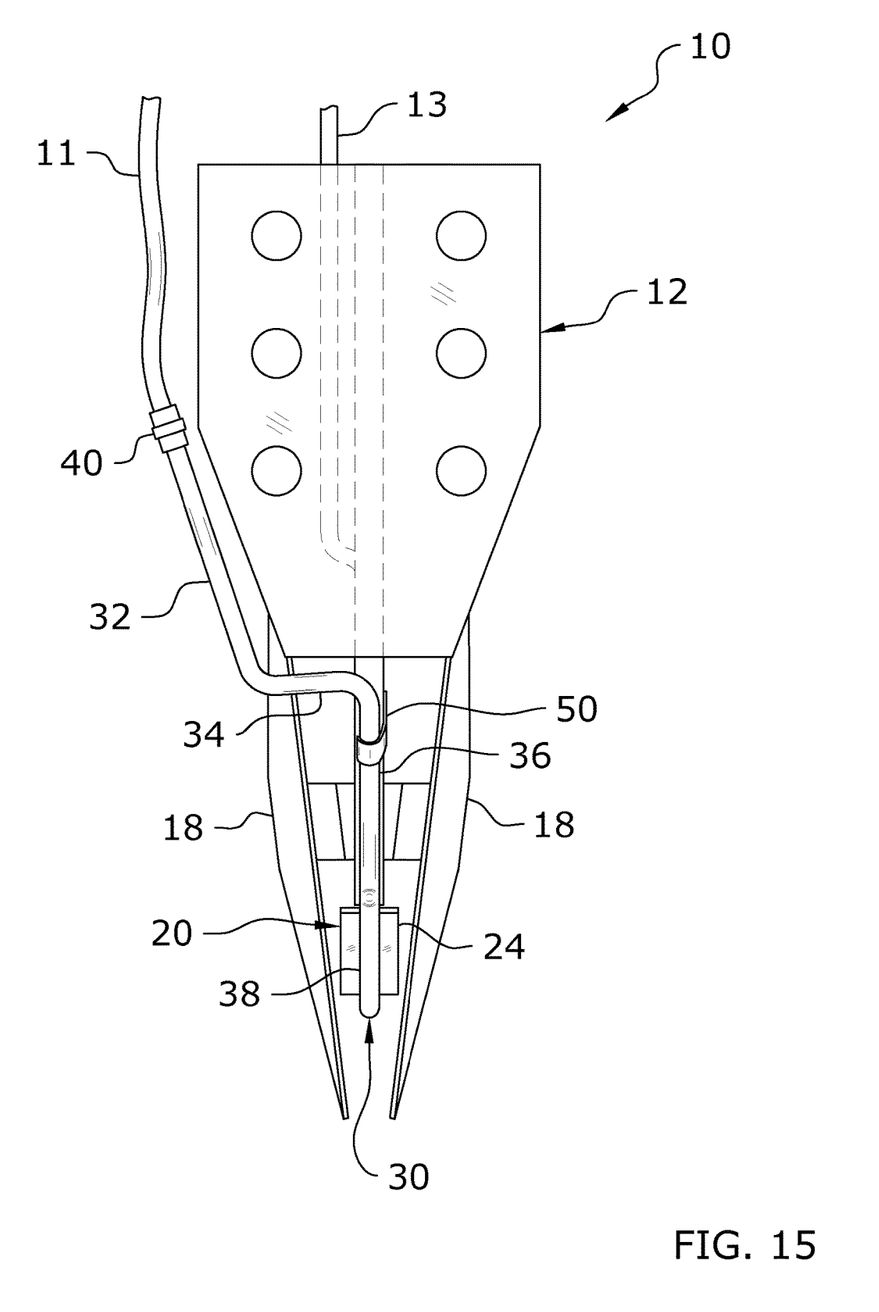
FIG. 15 is a front view of the present invention attached to the planter shank.

The fertilizer tube 30 is comprised of an elongated structure. The fertilizer tube 30 is not a straight structure as best illustrated in FIGS. 1 through 8 of the drawings. The fertilizer tube 30 has an input opening 31 at the upper end of the fertilizer tube 30 and an output opening 39 at the lower end of the fertilizer tube 30 as illustrated in FIGS. 1 and 2 of the drawings. The input opening 31 receives liquid fertilizer from a liquid fertilizer system and the output opening 39 dispenses the liquid fertilizer into a seed furrow or near a seed furrow created by the disks 18 of the planter implement. The lower portion of the fertilizer tube 30 is positioned between a pair of disks 18 of the planter implement when the fertilizer tube 30 is attached to the planter shank 14 as illustrated in FIGS. 14 and 15 of the drawings.

A coupler 40 fluidly connects the upper end of the fertilizer tube 30 to a fertilizer delivery tube 11 from the liquid fertilizer system of the planter implement. The coupler 40 is preferably comprised of a quick coupler 40 to allow for simple and easy connection of the fertilizer delivery tube 11 to the fertilizer tube 30.

The fertilizer tube 30 preferably has a circular cross sectional area but may have different cross sectional shapes (e.g. rectangular, oval). The lumen of the fertilizer tube 30 may be consistently in width or differing in width along the length of the fertilizer tube 30. The fertilizer tube 30 is preferably comprised of a continuous single tubular structure as illustrated in FIGS. 1 through 4 of the drawings. In particular, the fertilizer tube 30 is preferably constructed of a single piece of metal tubing that is bent to form the fertilizer tube 30. The fertilizer tube 30 is preferably comprised of a rigid material such as, but not limited to, metal.

The fertilizer tube 30 is comprised of a first segment 38 on the lower portion of the fertilizer tube 30, a second segment 36 extending from the first segment 38, a third segment 34 extending from the second segment 36 and a fourth segment 32 extending from the third segment 34. Each segment is defined by a bend or corner in the fertilizer tube 30 redirecting the fertilizer tube 30. Each segment is preferably comprised of a substantially straight structure having an independent longitudinal axis that doesn't align with any of the other segments' axis.

Figure 3:
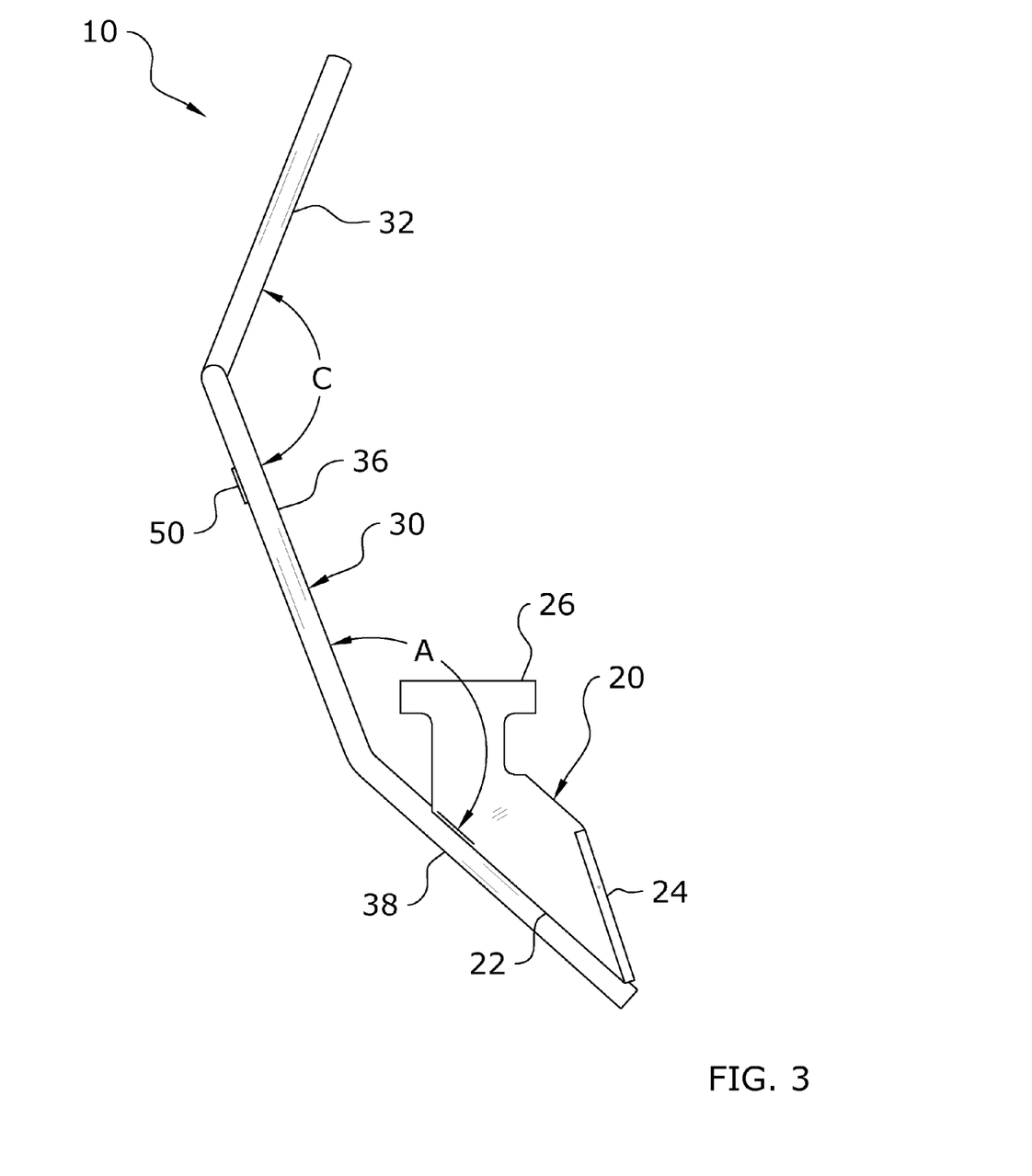
FIG. 3 is a left side view of the present invention.
Figure 4:
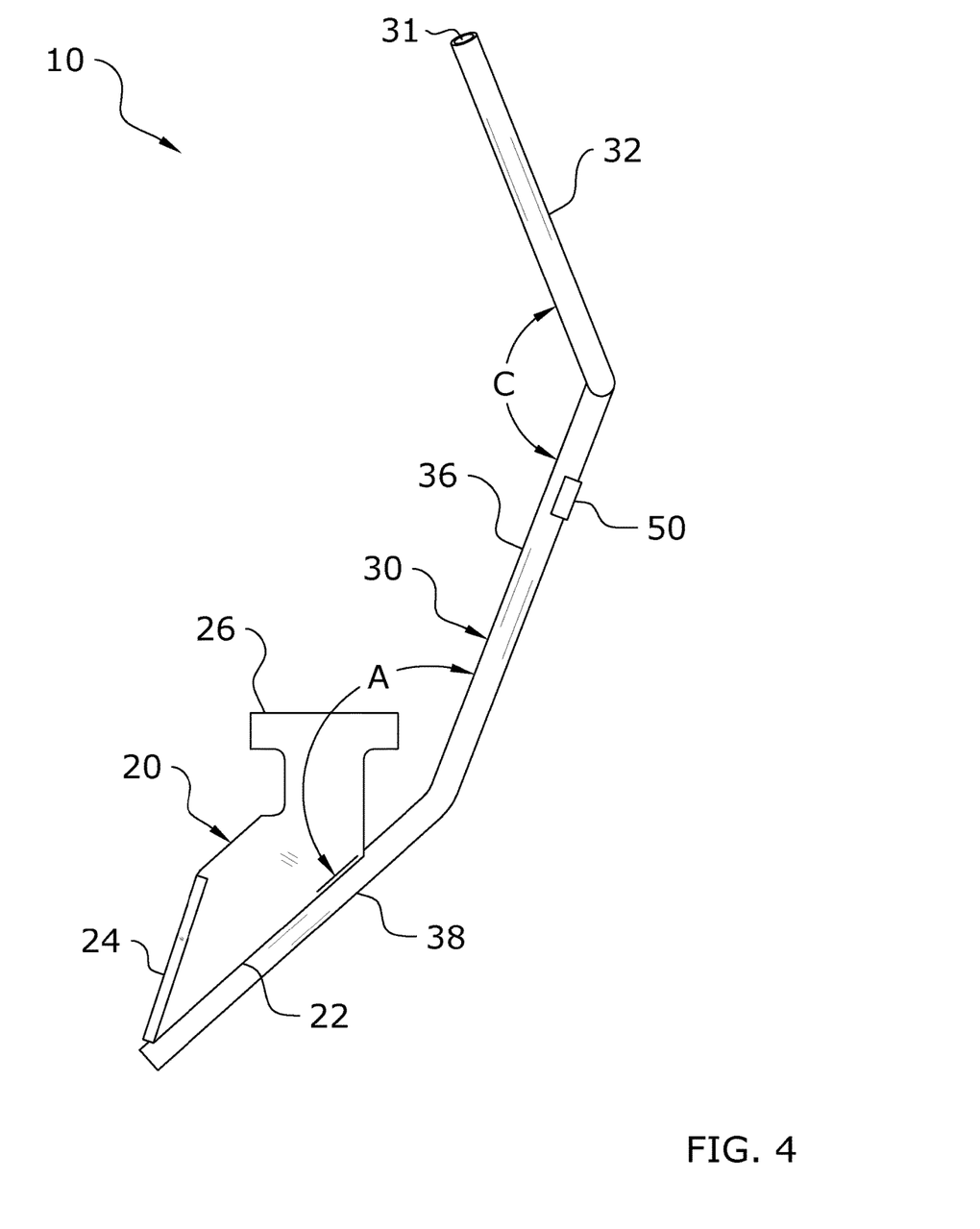
FIG. 4 is a right side view of the present invention.
Figure 7:
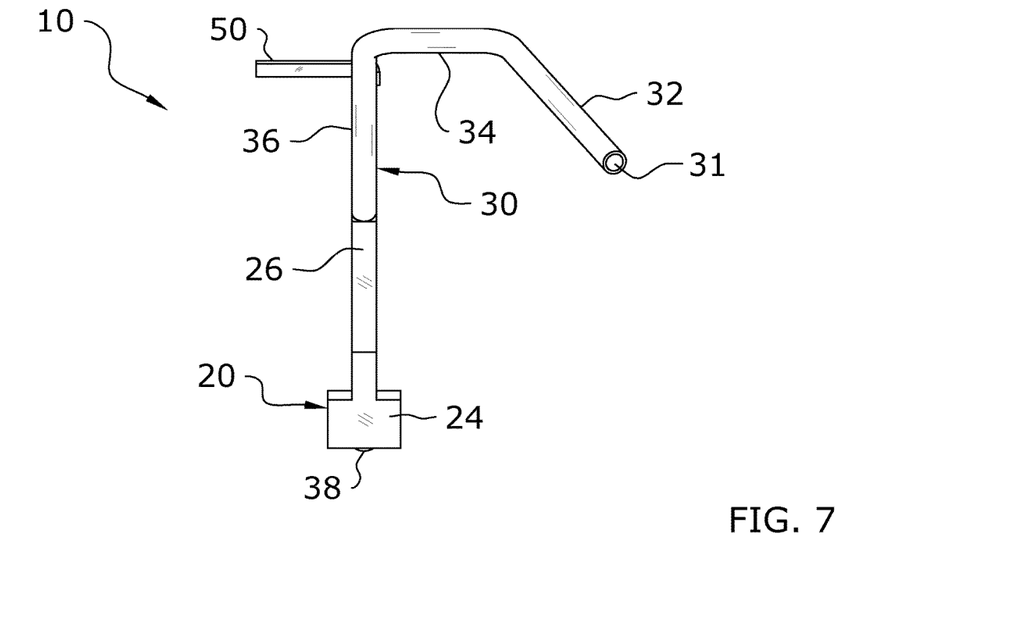
FIG. 7 is a top view of the present invention.
Figure 8:
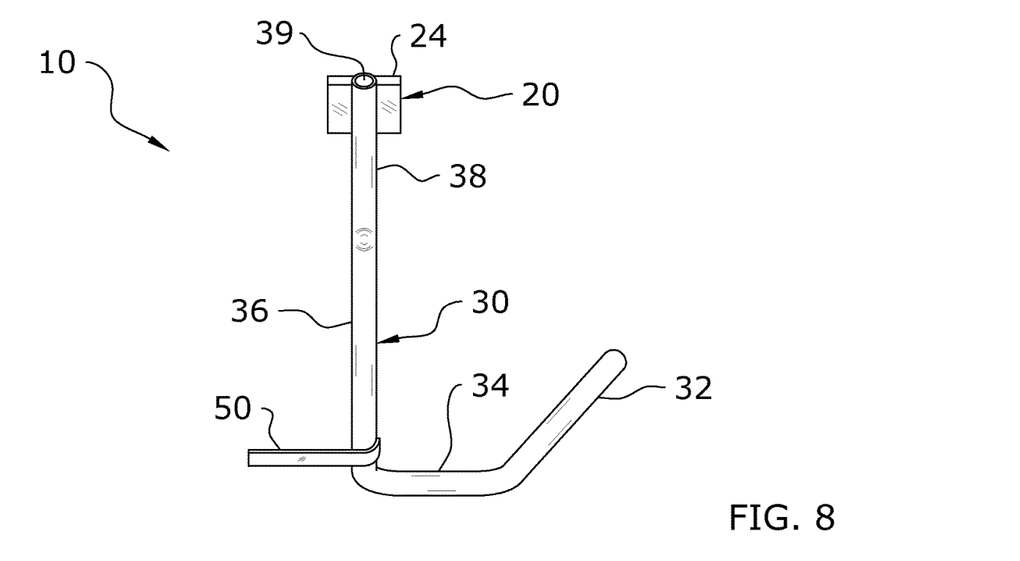
FIG. 8 is a bottom view of the present invention.

The first segment 38 of the fertilizer tube 30 is attached to a front edge 22 of the guard scraper 20 as best illustrated in FIGS. 3 and 4 of the drawings. A portion of the first segment 38 extends upwardly past the front edge 22 of the guard scraper 20 as illustrated in FIGS. 3 and 4. The output opening 39 is within a lower distal end of the first segment 38. The lower end and the output opening 39 within the lower end of the first segment 38 are positioned near the lower end of the guard scraper 20 as illustrated in FIGS. 1 through 4 of the drawings. The first segment 38 is further preferably parallel to and adjacent to the front edge 22 of the guard scraper 20 as further illustrated in FIGS. 3 and 4 of the drawings. The first segment 38 may be attached to the guard scraper 20 by welding or other attachment means. When in use, the fertilizer tube 30 will be positioned in front of the guard scraper 20 with the front edge 22 angled downwardly and rearwardly as best illustrated in FIGS. 3 and 4. A portion of the first segment 38 of the fertilizer tube 30 will wear from engaging the earth over time. The exterior width of the first segment 38 is preferably approximately the same width as the main body portion of the guard scraper 20 as illustrated in FIGS. 7 and 8 of the drawings.

Figure 5:
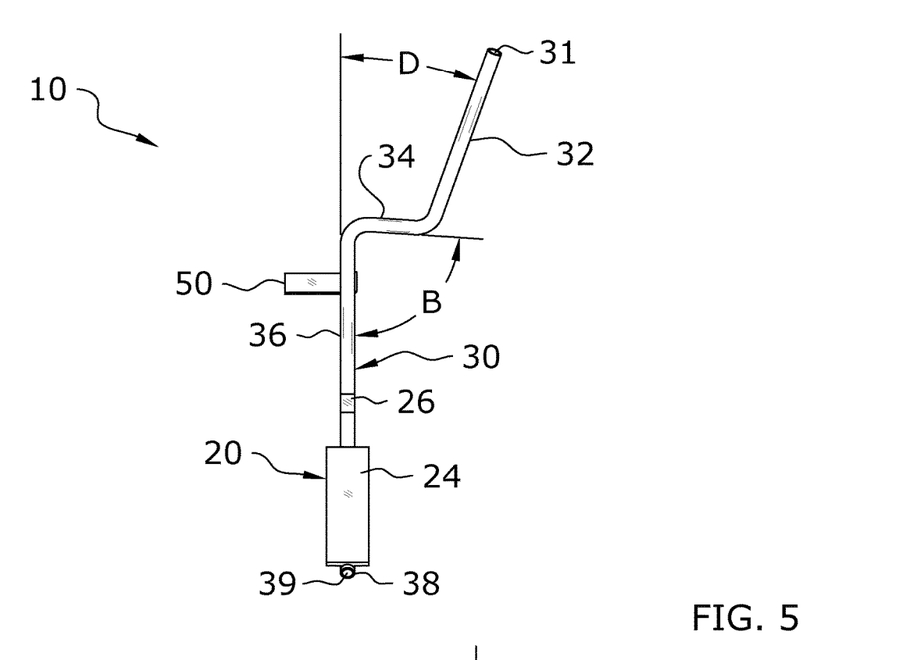
FIG. 5 is a rear view of the present invention.
Figure 12:
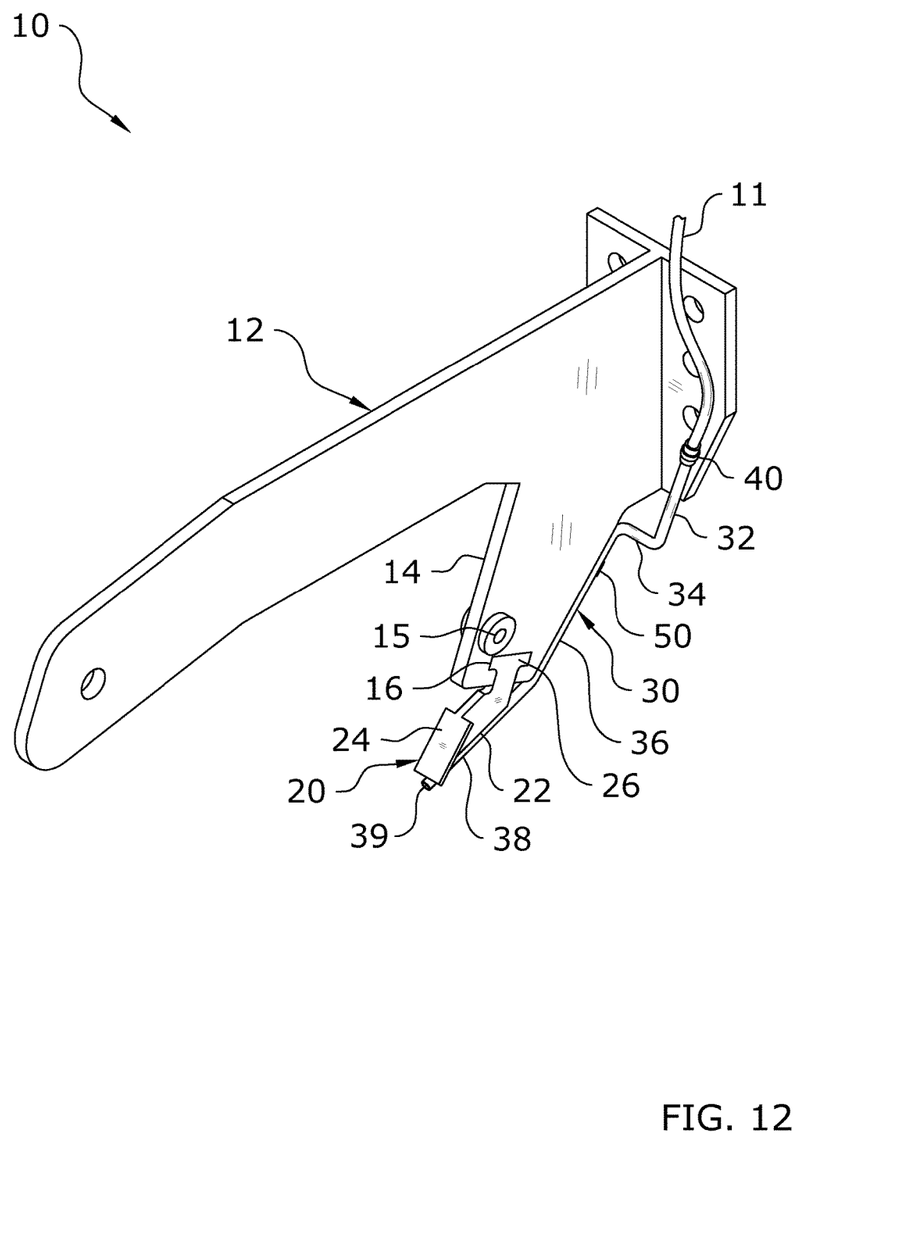
FIG. 12 is an upper right side perspective view of the guard scraper fully positioned in the T-slot of the planter shank.
Figure 13:
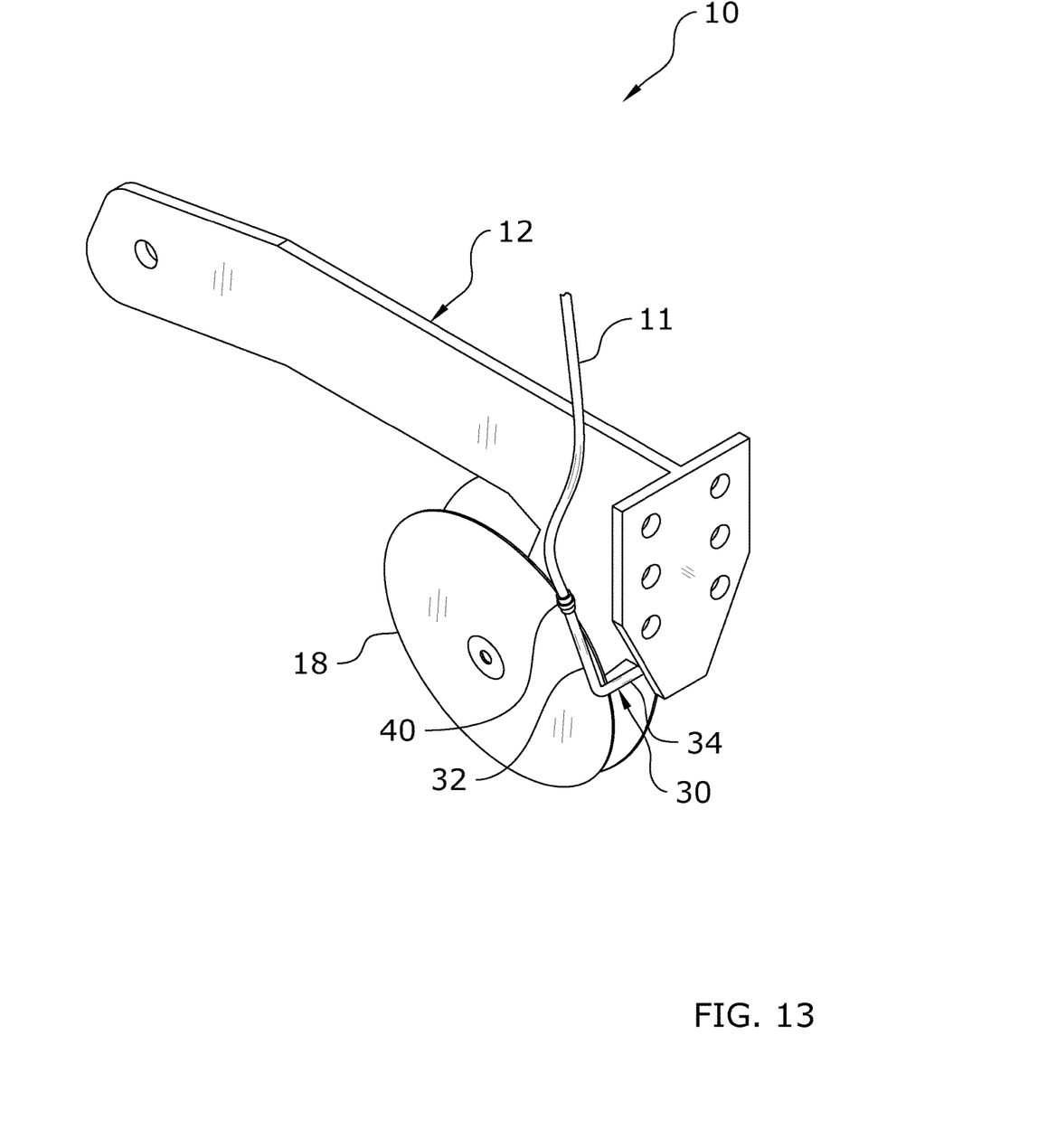
FIG. 13 is an upper left side perspective view of the present invention attached to the planter shank and with the disks attached to the planter shank.

The second segment 36 extends upwardly from the first segment 38 at an angle A as illustrated in FIGS. 3 and 4 of the drawings. The angle A is preferably approximately 153 degrees but may vary. It is preferable that the second segment 36 is parallel to a vertical plane comprised of a plane that is parallel to the forward path of movement of the planter implement that is vertically aligned. It is further preferable that both the first segment 38 and the second segment 36 are parallel with respect to the vertical plane as illustrated in FIGS. 5 and 8 of the drawings. The second segment 36 is preferably comprised of a straight segment extending from a first corner between the second segment 36 and the first segment 38 as illustrated in FIGS. 3 and 4 of the drawings. The second segment 36 has a longitudinal axis that is more vertically orientated than the first segment 38 when the fertilizer tube 30 is attached to the planter shank 14 as illustrated in FIG. 4 of the drawings. The second segment 36 is comprised of a substantially straight structure that is substantially parallel to a leading edge of the planter shank 14 and positioned in front of the leading edge of the planter shank 14 when installed as illustrated in FIG. 12 of the drawings.

Figure 6:
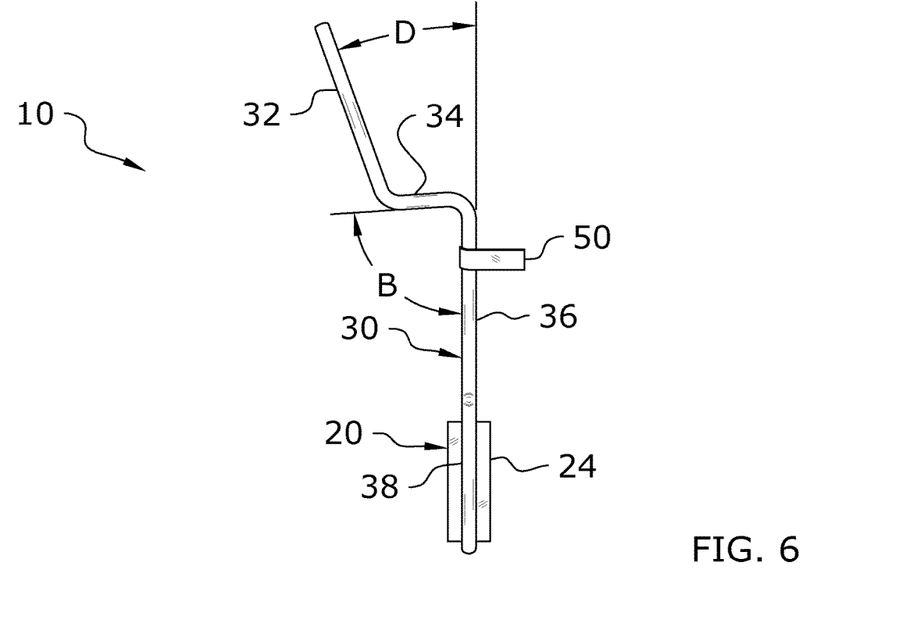
FIG. 6 is a front view of the present invention.

The fertilizer tube 30 is further comprised of a third segment 34 that extends substantially horizontally from the second segment 36 and a fourth segment 32 that extends upwardly from the third segment 34. The third segment 34 extends outwardly to the right of the second segment 36 at a second angle B as illustrated in FIGS. 5 and 6 of the drawings. The angle B is preferably approximately 85 degrees but may vary. The third segment 34 may extend horizontally to the right at a slight downward angle as illustrated in FIGS. 5 and 6 of the drawings. The third segment 34 is preferably substantially transverse with respect to the vertical plane discussed previously. The third segment 34 extends outwardly and away from the planter shank 14 as illustrated in FIG. 15 of the drawings.

The fourth segment 32 of the fertilizer tube 30 extends upwardly from the third segment 34 (opposite the end connected to the second segment 36) at an angle C measured with respect to the second segment 36 and the fourth segment 32 parallel to the vertical plane as illustrated in FIGS. 3 and 4 of the drawings. The angle C is preferably approximately 136 degrees but may vary. The fourth segment 32 of the fertilizer tube 30 also preferably extends outwardly and upwardly away from the end of the third segment 34 as illustrated in FIGS. 5 and 6 of the drawings. The fourth segment 32 extends at an angle D away from the third segment 34, wherein angle D is measured with respect to the axis of the second segment 36 and the axis of the fourth segment 32. The angle D is preferably approximately 24 degrees by may vary. The fourth segment 32 also extends at an angle E with respect to the axis of the third segment 34 as shown in FIG. 2 of the drawings. The angle E is approximately 109 degrees but may vary.

The first segment 38, the second segment 36 and the fourth segment 32 are each preferably longer than the third segment 34 as shown in FIGS. 1 through 4 of the drawings. The second segment 36 is approximately 2.5 inches in length. The first segment 38 is approximately the same length as the fourth segment 32 with both segments being approximately 7 inches in length. The second segment 36 is approximately 8 inches in length. It can be appreciated that the lengths for the segments of the fertilizer tube 30 may vary to accommodate different types of planters.

C. Guard Scraper

The guard scraper 20 is attached to a lower portion of the fertilizer tube 30 as illustrated in FIGS. 1 through 4 of the drawings. The guard scraper 20 is adapted to be removably attachable within a slot of a planter shank 14 of a planter implement. The guard scraper 20 may be comprised of any scraper that is removably attachable to a planter shank 14 of a planter implement such as, but not limited to, the KINZE scraper (Part Number GB0504) designed for the KINZE 4000 Series Cast Iron Row Unit (e.g. the KINZE 4900 planter implement) and manufactured by KINZE Manufacturing Inc. FIGS. 1 through 12 illustrate an exemplary guard scraper 20 that is based on the design of the KINZE scraper (Part Number GB0504) that fits within the slot 16 of the planter shank 14 extending from the planter frame 12 of the planter implement.

The fertilizer tube 30 is attached to a lower leading edge of the guard scraper 20 by welding or other attachment means (e.g. fasteners). The guard scraper 20 includes a front edge 22, a rear portion 24 and a mounting portion 26, wherein the fertilizer tube 30 is attached to the front edge 22 of the guard scraper 20. The rear portion 24 of the guard scraper 20 is comprised of a flanged structure extending outwardly on opposing sides of a body portion of the guard scraper 20 as best illustrated in FIGS. 1, 2 and 5 of the drawings. The rear portion 24 of the guard scraper 20 is broader in width than the main body portion of the guard scraper 20 and the fertilizer tube 30.

Figure 9:
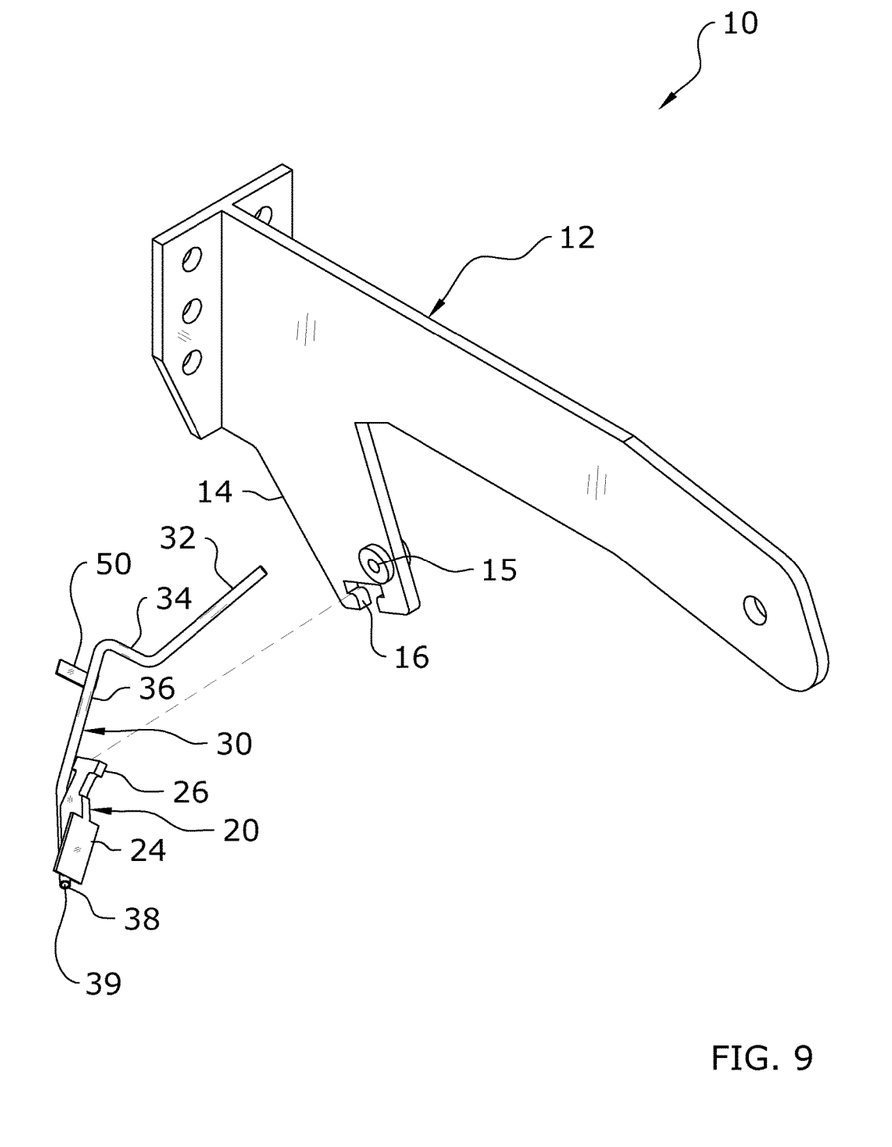
FIG. 9 is an exploded upper left side perspective view of the present invention with respect to a planter shank.

The slot within the planter shank 14 is comprised of a T-slot 16 as illustrated in FIG. 9 of the drawings. The mounting portion 26 of the guard scraper 20 is comprised of a T-shaped structure that has a similar shape and size to the T-slot 16 within the planter shank 14. The mounting portion 26 of the guard scraper 20 preferably snugly fits within the T-slot 16 of the planter shank 14 and is retained within the T-slot 16 when the disks 18 are attached to the planter shank 14 with a fastener extending through the mounting aperture 15 of the planter shank 14.

D. Tab

Figure 11:
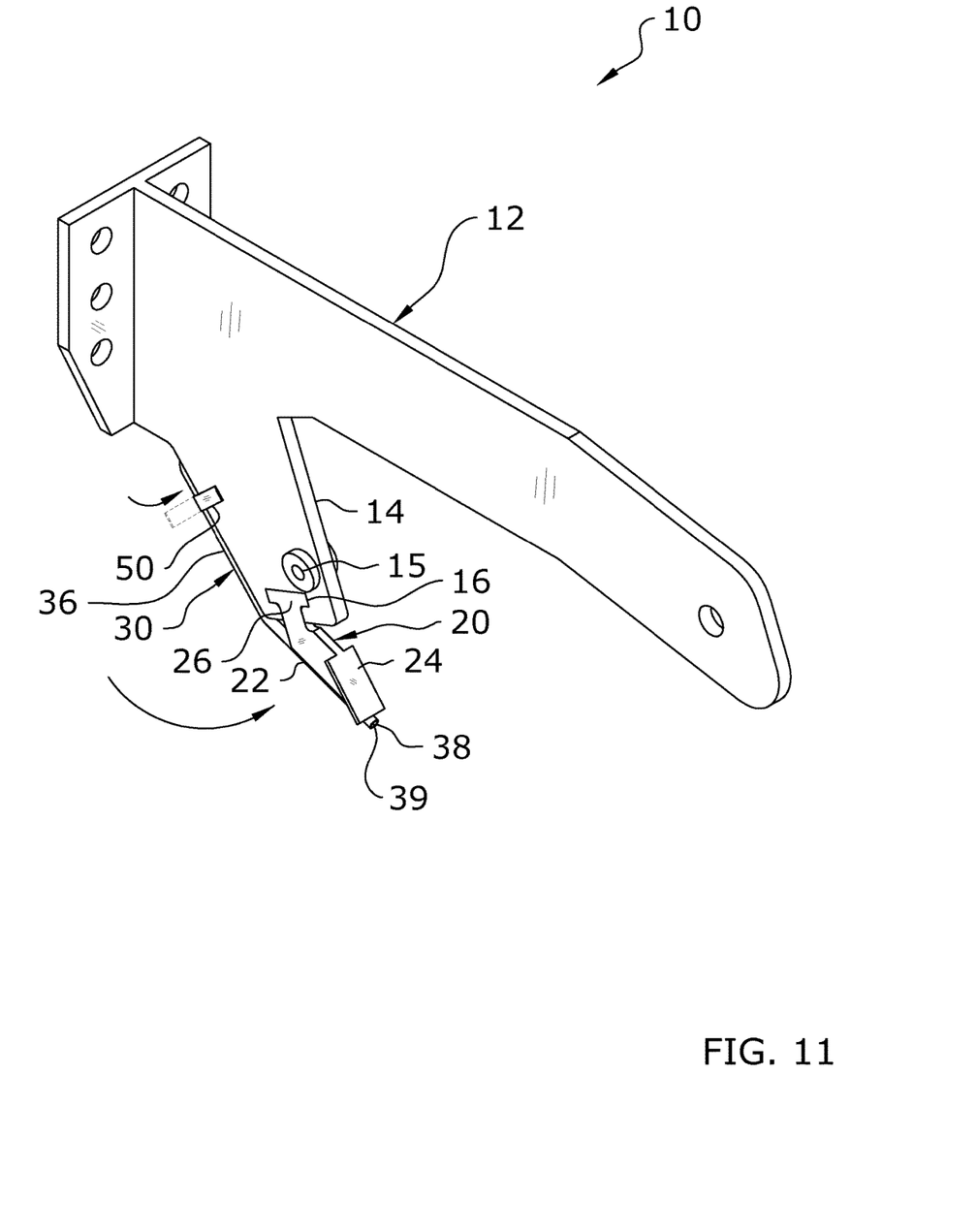
FIG. 11 is an upper left side perspective view of the guard scraper fully positioned in the T-slot of the planter shank and the tab bent over upon the planter shank.

The tab 50 is attached to a central portion of the fertilizer tube 30 between the input opening 31 and the output opening 39. The tab 50 is comprised of a bendable material such as a bendable metal material to allow an installer the ability to bend the tab 50 adjacent to the side of the planter shank 14 as illustrated in FIG. 11 of the drawings. It is preferable that the tab 50 is attached to an upper portion of the second segment 36 as illustrated in FIGS. 1 through 4 of the drawings. It is further preferable that the tab 50 is welded to the fertilizer tube 30 and the tab 50 is attached to at least a quarter of the circumference of the fertilizer tube 30. The tab 50 is further preferably comprised of a flat structure but may have a non-flat structure.

The tab 50 has an initial position as illustrated in FIGS. 1 through 9 of the drawings and a final position as illustrated in FIG. 11 of the drawings. The initial position of the tab 50 exists before the fertilizer tube 30 is attached to the planter shank 14 and the final position of the tab 50 exists after the fertilizer tube 30 is attached to the planter shank 14.

Figure 10:
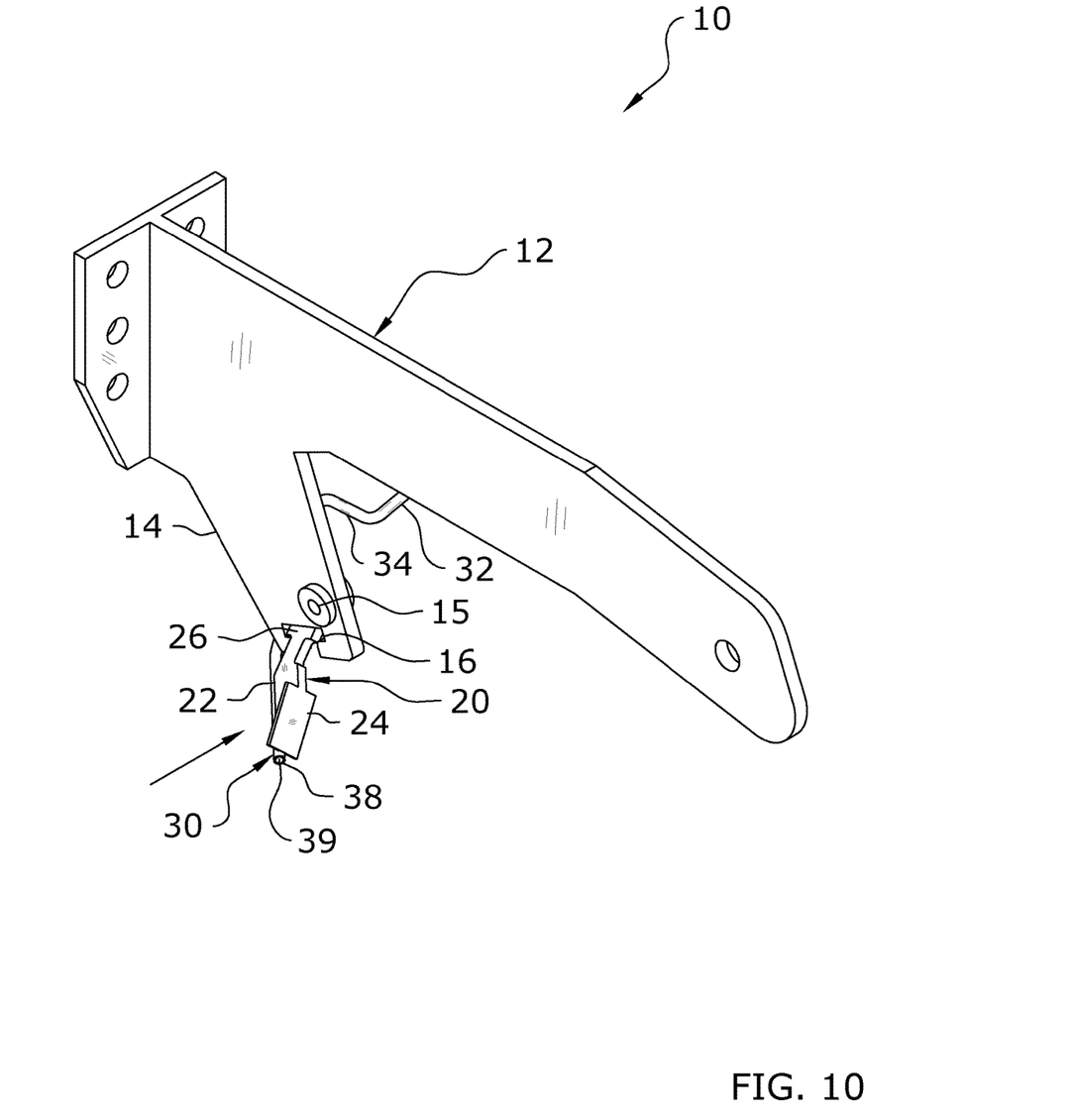
FIG. 10 is an upper left side perspective view of the present invention partially positioned within the T-slot of the planter shank.

The tab 50 extends transversely with respect to a plane that is parallel to a main body of the guard scraper 20 extending from front to back of the guard scraper 20 when the tab 50 is in the initial position as best illustrated in FIGS. 1, 2, 5 and 6 of the drawings. The initial position of the tab 50 allows for the fertilizer tube 30 to be installed upon the planter shank 14 without interfering with the alignment of the fertilizer tube 30 in front of the planter shank 14 as shown in FIGS. 9 through 11 of the drawings. The tab 50 is preferably approximately ninety-degrees with respect to the plane when the tab 50 is in the initial position but may have different transverse angles.

The tab 50 is bent approximately ninety-degrees after the fertilizer tube 30 is in the desired position with respect to the planter shank 14 to be positioned adjacent to the side of the planter shank 14 as shown in FIG. 11 of the drawings. It is preferable that over fifty-percent of the total length and/or surface area of the tab 50 is substantially parallel to the plane when the tab 50 is in the final position. The tab 50 wraps around the leading edge of the planter shank 14 as further illustrated in FIG. 11.

E. Operation of Preferred Embodiment

In use, a fertilizer tube 30 system 10 is attached to each planter shank 14 of a planter implement. To assemble fertilizer tube 30 system 10 to the planter implement, the user positions the mounting portion 26 of the guard scraper 20 within the receiver slot 16 of the planter shank 14 as shown in FIGS. 9 and 10 of the drawings. The user aligns the guard scraper 20, the first segment 38 and the second segment 36 to be aligned with the main body of the planter shank 14 as shown in FIG. 11 of the drawings. After everything is properly aligned, the user bends the tab 50 about the planter shank 14 to prevent movement of the fertilizer tube 30 and to provide support to the upper portion of the fertilizer tube 30. The user then uses a coupler 40 to connect the fertilizer tube 30 to a fertilizer delivery tube 11 as shown in FIGS. 12 through 15 of the drawings. Each fertilizer delivery tube 11 comes from a fertilizer reservoir or manifold and supplies the fertilizer to each fertilizer tube 30 system 10.

As the planter implement is pulled through the soil, the disks 18 create a V-shaped furrow in the soil which is well-known in the art of planters. The output opening 39 of the fertilizer tube 30 emits the liquid fertilizer onto the lower surface of the furrow in front of the seed tube 13 in preparation for the disbursement of the seed from the seed tube 13. The seed is then dispensed from the seed tube 13 and placed above the fertilizer within the furrow. The furrow is finally covered with soil to allow the seed to grow.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A fertilizer tube system for attachment to a planter implement, comprising:
   a fertilizer tube having an input opening at an upper end of said fertilizer tube and an output opening at a lower end of said fertilizer tube, wherein said input opening is adapted for receiving liquid fertilizer from a liquid fertilizer system and wherein said output opening is for dispensing said liquid fertilizer into a seed furrow;
   a tab attached to said fertilizer tube between said input opening and said output opening, wherein said tab is comprised of a bendable material; and a guard scraper attached to a lower portion of said fertilizer tube, wherein said guard scraper is adapted to be removably attachable within a slot of a planter shank of a planter implement.

2. The fertilizer tube system of claim 1, wherein said fertilizer tube is comprised of a continuous single structure.

3. The fertilizer tube system of claim 2, wherein said fertilizer tube is comprised of a rigid material.

4. The fertilizer tube of system claim 3, wherein said fertilizer tube is comprised of a metal.

5. The fertilizer tube of system claim 1, wherein said tab is comprised of a bendable metal material.

6. The fertilizer tube of system claim 1, wherein said tab is attached to a central portion of said fertilizer tube.

7. The fertilizer tube system of claim 1, wherein said tab is welded to said fertilizer tube.

8. The fertilizer tube system of claim 1, wherein said fertilizer tube is attached to a lower leading edge of said guard scraper.

9. The fertilizer tube system of claim 1, wherein said guard scraper is welded to said fertilizer tube.

10. The fertilizer tube system of claim 1, wherein said fertilizer tube has a circular cross sectional area.

11. The fertilizer tube system of claim 1, wherein said tab is comprised of a flat structure.

12. The fertilizer tube system of claim 1, wherein said tab has an initial position and a final position, wherein said initial position exists before said fertilizer tube system is attached to said planter shank and wherein said final position exists after said fertilizer tube system is attached to said planter shank.

13. The fertilizer tube system of claim 12, wherein said tab extends transversely with respect to a plane that is parallel to a main body of said guard scraper extending from front to back of said guard scraper when said tab is in said initial position.

14. The fertilizer tube system of claim 13, wherein said tab is approximately ninety-degrees with respect to said plane when said tab is in said initial position.

15. The fertilizer tube system of claim 13, wherein over fifty-percent of said tab is substantially parallel to said plane when said tab is in said final position.

16. The fertilizer tube system of claim 1, wherein said guard scraper includes a front edge, a rear portion and a mounting portion, wherein said fertilizer tube is attached to said front edge of said guard scraper.

17. The fertilizer tube system of claim 16, wherein said rear portion is comprised of a flanged structure extending outwardly on opposing sides of a body portion of said guard scraper.

18. The fertilizer tube system of claim 1, wherein said fertilizer tube is comprised of a first segment attached to a front edge of said guard scraper and a second segment extending upwardly from said first segment at an angle, wherein said output opening is within a lower distal end of said first segment, wherein said first segment is comprised of a substantially straight structure that is substantially parallel to said front edge of said guard scraper and wherein said second segment is comprised of a substantially straight structure that is substantially parallel to said leading edge of said planter shank.

19. The fertilizer tube system of claim 18, wherein said fertilizer tube is comprised of a third segment that extends substantially horizontally from said second segment and a fourth segment that extends upwardly from said third segment.

20. A fertilizer tube system for attachment to a planter implement, comprising:
  a fertilizer tube having an input opening at an upper end of said fertilizer tube and an output opening at a lower end of said fertilizer tube, wherein said input opening is adapted for receiving liquid fertilizer from a liquid fertilizer system and wherein said output opening is adapted for dispensing said liquid fertilizer into a seed furrow;
  a tab attached to said fertilizer tube between said input opening and said output opening, wherein said tab is comprised of a bendable material;
  a guard scraper attached to a lower portion of said fertilizer tube, wherein said guard scraper is adapted to be removably attachable within a slot of a planter shank of a planter implement;
  wherein said guard scraper includes a front edge, a rear portion and a mounting portion, wherein said fertilizer tube is attached to said front edge of said guard scraper; and
  wherein said slot within said planter shank is comprised of a T-slot and wherein said mounting portion of said guard scraper is comprised of a T-shaped structure that snugly fits within said T-slot of said planter shank.

* * * * *